United States Patent
Kinoshita

(10) Patent No.: US 8,612,945 B2
(45) Date of Patent: Dec. 17, 2013

(54) XML PROCESSING DEVICE, XML PROCESSING METHOD, AND XML PROCESSING PROGRAM

(75) Inventor: Satoshi Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 406 days.

(21) Appl. No.: 12/992,162

(22) PCT Filed: Apr. 10, 2009

(86) PCT No.: PCT/JP2009/057330
§ 371 (c)(1),
(2), (4) Date: Nov. 11, 2010

(87) PCT Pub. No.: WO2009/139245
PCT Pub. Date: Nov. 19, 2009

(65) Prior Publication Data
US 2011/0066809 A1     Mar. 17, 2011

(30) Foreign Application Priority Data
May 13, 2008    (JP) ................................. 2008-126515

(51) Int. Cl.
*G06F 9/45*      (2006.01)
*G06F 9/44*      (2006.01)

(52) U.S. Cl.
USPC ............ 717/137; 717/136; 717/140; 717/168

(58) Field of Classification Search
None
See application file for complete search history.

(56) References Cited

U.S. PATENT DOCUMENTS

| | | | | |
|---|---|---|---|---|
| 7,426,548 B2 * | 9/2008 | Griffin et al. | ................. | 717/137 |
| 7,467,149 B2 * | 12/2008 | Gaurav et al. | ................. | 717/137 |
| 7,506,257 B1 * | 3/2009 | Chavez et al. | ................. | 717/168 |
| 7,716,632 B2 * | 5/2010 | Covely, III | ..................... | 717/137 |
| 7,945,903 B1 * | 5/2011 | Castillo et al. | ................. | 717/140 |
| 8,146,075 B2 * | 3/2012 | Mahajan | ....................... | 717/168 |
| 8,219,972 B1 * | 7/2012 | Cornish | ........................ | 717/140 |
| 8,312,451 B2 * | 11/2012 | Poole et al. | .................... | 717/168 |
| 8,397,222 B2 * | 3/2013 | Warren | ......................... | 717/137 |

(Continued)

FOREIGN PATENT DOCUMENTS

| | | |
|---|---|---|
| JP | 5-2417 A | 1/1993 |
| JP | 11-96166 A | 4/1999 |

(Continued)

OTHER PUBLICATIONS

InterSystems; Using XML with Cache; Jun. 15, 2006; version 5.1; retrieved online on Aug. 9, 2013; pp. 1-46; Retrieved from the Internet: <URL: http://docs.intersystems.com/documentation/cache/cache51/PDFS/GXML.pdf>.*

(Continued)

*Primary Examiner* — Thuy Dao
*Assistant Examiner* — Hanh T Bui

(57) ABSTRACT

Provided is an XML processing device capable of describing, using conventional XML processing language, a method of processing also an asynchronously inputted XML. The XML processing device converts, according to a predetermined rule, the XML inputted asynchronously from outside and outputs the XML. The XML processing device is characterized by including an XML conversion module which performs XML conversion of the XML inputted according to the rule, an output destination interpretation module which interprets an output destination described in the converted XML, and an output distribution module which allows the XML to be outputted to the output destination interpreted by the output destination interpretation module.

7 Claims, 15 Drawing Sheets

(56) References Cited

U.S. PATENT DOCUMENTS

| | | | |
|---|---|---|---|
| 8,473,937 B2* | 6/2013 | Oberhauser et al. | 717/137 |
| 2005/0010896 A1* | 1/2005 | Meliksetian et al. | 717/136 |
| 2005/0138246 A1* | 6/2005 | Chen et al. | 710/71 |
| 2005/0273772 A1* | 12/2005 | Matsakis et al. | 717/140 |
| 2007/0061786 A1* | 3/2007 | Zhou et al. | 717/136 |
| 2007/0214411 A1* | 9/2007 | Puthiyaveettil | 715/523 |
| 2008/0104579 A1* | 5/2008 | Hartmann | 717/136 |
| 2008/0288928 A1* | 11/2008 | Bowers et al. | 717/136 |
| 2008/0306986 A1* | 12/2008 | Doyle, Sr. | 717/136 |
| 2009/0210864 A1* | 8/2009 | Oberhauser et al. | 717/140 |
| 2009/0217154 A1* | 8/2009 | Chowdhury | 715/234 |
| 2011/0202905 A1* | 8/2011 | Mahajan | 717/140 |

FOREIGN PATENT DOCUMENTS

| | | |
|---|---|---|
| JP | 11-298520 A | 10/1999 |
| JP | 11-338794 A | 12/1999 |
| JP | 2002006942 A | 1/2002 |
| JP | 2003271441 A | 9/2003 |
| JP | 2005535982 A | 11/2005 |
| JP | 2006018449 A | 1/2006 |
| JP | 2006259928 A | 9/2006 |
| JP | 2007018029 A | 1/2007 |
| JP | 2007034763 A | 2/2007 |

OTHER PUBLICATIONS

Morgan Kaufmann; Fast SOA: The way to use native XML technology to achieve Service Oriented Architecture governance, saclability, and performance; 2007; retrieved online on Aug. 9, 2013; pp. 1-2; Retrieved from the Internet: <URL: http://dl.acm.org/citation.cfm?id=1202038&coll=DL&dl=GUIDE&CFID=352926179&CFTOKEN=33956273>.*

Fabiana Frata Furlan Peres and Ronaldo dos Santos Mello; A Rule-based Conversion of an Object-Oriented Database Schema to a Schema in XML Schema; 2009; retrieved online on Aug. 9, 2013; pp. 197-203; Retrieved from the Internet: <URL: http://ieeexplore.ieee.org/stamp/stamp.jsp?tp=&arnumber=5356777>.*

International Search Report for PCT/JP2009/057330 mailed Jun. 23, 2009.

* cited by examiner

| IDENTIFIER | OUTPUT DESTINATION |
|---|---|
| CACHE | CACHE MEMORY 14 |
| http | XML TRANSMISSION MODULE 27 |

```
<xsl:stylesheet xmlns:xsl="http://www.w3.org/1999/XSL/Transform"version="1.0">
    <xsl:output method="xml" />
    <xsl:template match="/">
        <result>
            <xsl:if test="/sensor/temperature/text()>=20">
                <output to="http">
                    <sensor>
                        <xsl:copy-of select="cache()/cache/temperature"/>
                        <xsl:copy-of select="/sensor/temperature"/>
                    </sensor>
                </output>
            </xsl:if>
            <output to="cache">
                <append>
                    <xsl:copy-of select="/sensor/temperature"/>
                </append>
            </output>
            <output to="cache">
                <remove select="/sensor/temperature[position() <=last()-2]"/>
            </output>
        </result>
    </xsl:template>
</xsl:stylesheet>
```

201 = first block (xsl:if ... /xsl:if)
202 = second block (output to="cache" append)
203 = third block (output to="cache" remove)

FIG.5

```
      ⟨result⟩
    ┌ ⟨output to="http"⟩
    │    ⟨sensor⟩
    │       ⟨temperature⟩17⟨/temperature⟩
251 ┤       ⟨temperature⟩19⟨/temperature⟩
    │       ⟨temperature⟩20⟨/temperature⟩
    │    ⟨/sensor⟩
    └ ⟨/output⟩
    ┌ ⟨output to="cache"⟩
    │    ⟨append⟩
252 ┤       ⟨temperature⟩20⟨/temperature⟩
    │    ⟨append⟩
    └ ⟨/output⟩
    ┌ ⟨output to="cache"⟩
253 ┤    ⟨remove select="/sensor/temperature[position() <.=last()-2]"/⟩
    └ ⟨/output⟩
      ⟨/result⟩
```

```
<xsl:stylesheet xmlns:xsl="http://www.w3.org/1999/XSL/Transform" version="1.0">
  <xsl:output method="xml" />
  <xsl:template match="/">
    <result>
      501 { <output to="henkan3">
              <dummy/>
            </output>
      502 { <output to="cache">
              <remove select="/cache/temperature"/>
            </output>
      503 { <output to="cache">
              <append>
                <xsl:copy-of select="/sensor/temperature"/>
              </append>
            </output>
    </result>
  </xsl:template>
</xsl:stylesheet>
```

```
<xsl:stylesheet xmlns:xsl="http://www.w3.org/1999/XSL/Transform" version="1.0">
  <xsl:output method="xml" />
  <xsl:template match="/">
    <result>
      511 { <output to="henkan3">
              <dummy/>
            </output>
      512 { <output to="cache">
              <remove select="/cache/humidity"/>
            </output>
      513 { <output to="cache">
              <append>
                <xsl:copy-of select="/sensor/humidity"/>
              </append>
            </output>
    </result>
  </xsl:template>
</xsl:stylesheet>
```

```
<xsl:stylesheet xmlns:xsl="http://www.w3.org/1999/XSL/Transform"version="1.0">
    <xsl:output method="xml" />
    <xsl:template match="/">
        <result>
            <xsl:if test="/cache()cache/temperature and cache() /cache/humidity">
                <output to="http">
                    <sensor>
                        <xsl:copy-of select="cache() /cache/temperature"/>
                        <xsl:copy-of select="cache()cache/humidity"/>
                    </sensor>
                </output>
                <output to="cache">
                    <remove select="/cache/*"/>
                </output>
            </xsl:if>
        </result>
    </xsl:template>
</xsl:stylesheet>
```

521 encompasses the xsl:if block; 522 encompasses the output to="http" block; 533 encompasses the output to="cache" block.

FIG.10A

```
<result>
    <output to="henkan3">
        <dummy/>
    </output>
    <output to="cache">
        <remove select="/cache /temperature"/>
    </output>
    <output to="cache">
        <append>
            <temperature>19</temperature>
        </append>
    </output>
</result>
```

FIG.10B

```
<result>
    <output to="henkan3">
        <dummy/>
    </output>
    <output to="cache">
        <remove select="/cache /humidity"/>
    </output>
    <output to="cache">
        <append>
            <humidity>30</humidity>
        </append>
    </output>
</result>
```

FIG.10C

```
<result>
    <output to="http">
        <sensor>
            <temperature>19</temperature>
            <humidity>30</humidity>
        </sensor>
    </output>
    <output to="cache">
        <remove select="/cache *"/>
    </output>
</result>
```

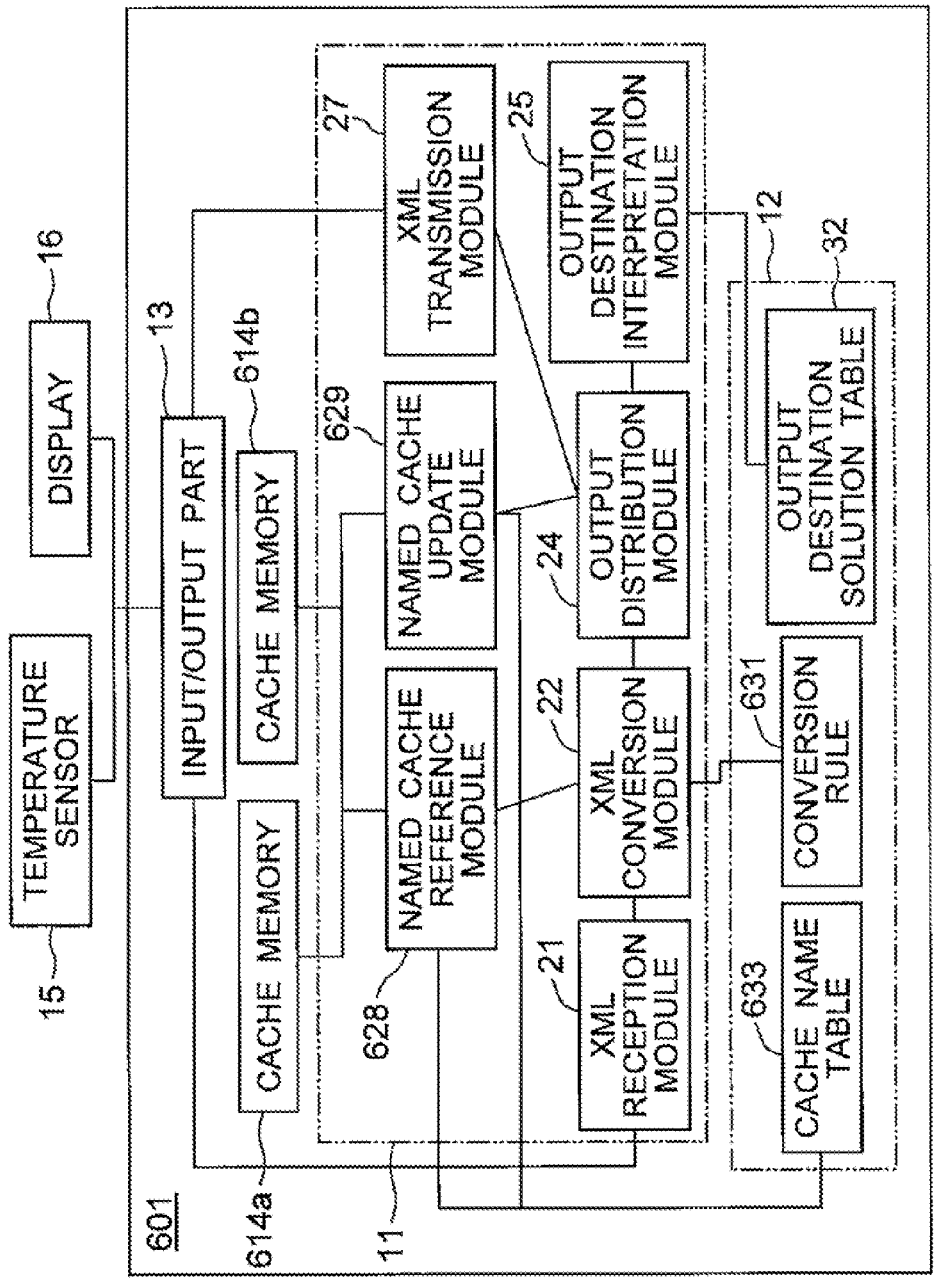

| IDENTIFIER | OUTPUT DESTINATION |
|---|---|
| temp 1 | CACHE MEMORY 614a |
| temp 2 | CACHE MEMORY 614b |

FIG.14

```
631
(xsl:stylesheet xmlns:xsl="http://www.w3.org/1999/XSL/Transform"version="1.0")
    (xsl:output method="xml" /)
    (xsl:template match="/")
        (result)
801 ⎧     (xsl:choose)
    ⎪         (xsl:when test="/sensor/temperature/text()>=20")
    ⎪     802 ⎧ (xsl:if test="/count(cache('temp1')/cache/temperature)=2")
    ⎪         ⎪     (output to="http")
    ⎪         ⎨         (sensor1)
    ⎪         ⎪             (xsl:copy-of select="cache('temp1')/cache/temperature"/)
    ⎪         ⎪             (xsl:copy-of select="/sensor/temperature"/)
    ⎪         ⎪         (/sensor1)
    ⎪         ⎪     (/output)
    ⎪         ⎩ (/xsl:if )
    ⎪     803 ⎧ (output to="temp1")
    ⎪         ⎨     (append)
    ⎪         ⎪         (xsl:copy-of select="/sensor/temperature"/)
    ⎪         ⎪     (/append)
    ⎪         ⎩ (/output)
    ⎪         (/xsl:when)
    ⎪         (xsl:when test="/sensor/temperature/text()<=5")
    ⎪     811 ⎧ (xsl:if test="/count(cache('temp2')/cache/temperature)=2")
    ⎪         ⎪     (output to="http")
    ⎨         ⎨         (sensor2)
    ⎪         ⎪             (xsl:copy-of select="cache('temp2')/cache/temperature"/)
    ⎪         ⎪             (xsl:copy-of select="/sensor/temperature"/)
    ⎪         ⎪         (/sensor2)
    ⎪         ⎪     (/output)
    ⎪         ⎩ (/xsl:if )
    ⎪     812 ⎧ (output to="temp2")
    ⎪         ⎨     (append)
    ⎪         ⎪         (xsl:copy-of select="/sensor/temperature"/)
    ⎪         ⎪     (/append)
    ⎪         ⎩ (/output)
    ⎪         (/xsl:when)
    ⎪         (xsl:otherwise)
    ⎪     821 ⎧ (output to="temp1")
    ⎪         ⎨     (remove select="/sensor/temperature"/)
    ⎪         ⎩ (/output)
    ⎪     822 ⎧ (output to="temp2")
    ⎪         ⎨     (remove select="/sensor/temperature"/)
    ⎪         ⎩ (/output)
    ⎪         (/xsl:otherwise)
    ⎩     (/xsl:choose)
        (/rssult)
    (/xsl:template)
(/xsl:stylesheet)
```

FIG.15

```
<result>
  <output to="http">
    <sensor2>
      <temperature>3</temperature>
      <temperature>4</temperature>
      <temperature>-3</temperature>
    </sensor2>
  </output>
  <output to="temp2">
    <append>
      <temperature>-3</temperature>
    </append>
  </output>
</result>
```

XML PROCESSING DEVICE, XML PROCESSING METHOD, AND XML PROCESSING PROGRAM

TECHNICAL FIELD

The present invention relates to an XML processing device, an XML processing method, and an XML processing program.

BACKGROUND ART

There are following technical documents regarding format conversions of XML documents. Patent Document 1 describes a device in which a server converts an XML format transmitted from a client and stores it to a cache memory. Patent Document 2 describes a device that converts an XML format already existing as a file according to a definition of XSLT.

Patent Document 3 describes a device that converts an XML format according to XSLT acquired from an XSLT managing server and outputs it via a network. Patent Document 4 describes a processing device that is capable of switching output to a shared buffer and outside by an XPath method in XML filtering processing. Patent Document 5 described a device that performs streaming conversion of an XML which does not build a complete object tree within a memory.

Patent Document 1: Japanese Unexamined Patent Publication 2003-271441
Patent Document 2: Japanese Unexamined Patent Publication 2006-018449
Patent Document 3: Japanese Unexamined Patent Publication 2007-018029
Patent Document 4: Japanese Unexamined Patent Publication 2007-034763
Patent Document 5: Japanese Unexamined Patent Publication 2005-535982

DISCLOSURE OF THE INVENTION

Problems to be Solved by the Invention

The techniques depicted in Patent Documents 1-5 are all related to synchronous conversion of an XML format. "Synchronous" herein means to perform conversion of XML input, and outputs a single XML when there is a single XML input. In synchronous format conversion, an input corresponds to an output necessarily on one on one basis, and a conversion and an output are performed necessarily at a timing at which an input is performed. While the format conversion depicted in Patent Document 5 is done in a streaming manner, an input corresponds to an output on one on one basis. Thus, there is no difference from being "synchronous".

Recently, however, not only the synchronous conversion of the XML format, but there is also a demand for being able to input asynchronously outputted data such as temperatures, humidity, RFID, and the like outputted from a sensor, for example, to an XML processing device as an XML, and to output those according to, a prescribed vile and format. More specific examples thereof are a case where measured temperature values of past three times are outputted when the temperature inputted as the XML text is 20 degrees or higher or a case where the temperature and the humidity are outputted simultaneously when both the temperature and the humidity inputted as the XML text at different timings are within prescribed ranges thereof, for example.

The techniques depicted in Patent Documents 1-5 cannot deal with such asynchronous data. Thus, it is required to write an exclusive program for processing asynchronous data, which ruins such versatility of the XML that the processing method can be easily written by XSLT. Also, it increases the cost in programming.

An object of the present invention therefore is to provide an XML processing device, an XML processing method, and an XML processing program, which can write a processing method also for an asynchronous XML input by using an existing XML processing language.

Means for Solving the Problems

In order to achieve the foregoing object, the XML processing device according to the present invention is characterized as an XML processing device which converts and outputs an XML inputted asynchronously from outside according to a prescribed rule, and the XML processing device includes: an XML conversion module that converts the inputted XML according to the rule; an output destination interpretation module that interprets an output destination written in the converted XML; and an output distribution module that outputs the XML to the output destination interpreted by the output destination interpretation module.

In order to achieve the foregoing object, another XML processing device according to the present invention is characterized as an XML processing device which converts and outputs a first XML and a second XML inputted asynchronously from outside according to a prescribed rule, and the XML processing device includes: a first XML conversion module that converts the inputted first XML according to the rule; a second XML conversion module that converts the inputted second XML according to the rule; a first output destination interpretation module that interprets the output destinations written in the converted first XML and the second XML; a first output distribution module that outputs the XML to the output destinations interpreted by the first output destination interpretation module; a third XML conversion module that further converts the converted first XML and second XML according to the rule; a second output destination interpretation module that interprets an output destination written in a converted third XML; and a second output distribution module that outputs the XML to the output destination interpreted by the second output destination interpretation module.

In order to achieve the foregoing object, the XML processing method according to the present invention is characterized as an XML processing method which converts and outputs an XML inputted asynchronously from outside according to a prescribed rule, and the method includes: converting the inputted XML according to the rule; then interpreting an output destination written in the converted XML; and thereafter outputting the XML to the output destination interpreted by the output destination interpretation module.

In order to achieve the foregoing object, the XML processing program according to the present invention is characterized to cause a computer, which controls an XML processing device that converts and outputs an XML inputted asynchronously from outside according to a prescribed rule, to execute: XML conversion processing that converts the inputted XML according to the rule; output destination interpretation processing that interprets an output destination written in the converted XML; and output distribution processing that outputs the XML to the output destination interpreted by the output destination interpretation processing.

Effect of the Invention

The present invention is structured to be able to output the converted XML to the output destination written in the XML, so that it is possible to output the XML to the output destinations where different processing is to be performed according to the conditions. This makes it possible to provide the excellent XML processing device, XML processing method, and XML processing program capable of writing the processing method even for the asynchronous XML input by an existing XML processing language, which has not been achieved conventionally.

BEST MODES FOR CARRYING OUT THE INVENTION

Hereinafter, exemplary embodiments of the invention will be described in details by referring to the accompanying drawings.

First Exemplary Embodiment

FIG. 1 is a block diagram showing the structure of an XML processing device 1 according to a first exemplary embodiment of the invention. The XML processing device 1 is a computer device configured with a control unit 11, a storage unit 12, an input/output part 13, and a cache memory 14. The control unit 11 is configured with a CPU, a RAM, an OS, and the like, and it is the center of the computer which executes application software. The storage unit 12 is an external storage device such as a magnetic disk device, an optical disk device, or the like.

The input/output part 13 exchanges data between each external device connected to the XML processing device 1. In a case shown in FIG. 1, a temperature sensor 15 as an input device and a display 16 as an output device are connected to the input/output part 13. However, it is needless to mention that the input device and the output device are not limited only to those. The cache memory 14 is a measure for temporarily storing the data that is processed by the control unit 11.

The control unit 11 includes an XML reception module 21, an XML conversion module 22, a cache reference module 23, an output distribution module 24, an output destination interpretation module 25, a cache update module 26, and an XML transmission module 27. In the case of FIG. 1, the XML reception module 21, the XML conversion module 22, the cache reference module 23, the output distribution module 24, the output destination interpretation module 25, the cache update module 26, and the XML transmission module 27 of the control unit 11 are implemented on software by causing the CPU to execute an XML processing program. However, those may also be built as hardware. A conversion rule 31 and an output destination solution table 32 are stored in the storage unit 12.

The XML reception module 21 receives an XML by a protocol such as HTTP from outside via the input/output part 13. The XML conversion module 22 reads out the conversion rule 31 written in an XML processing language such as XSLT or XQuery from the storage unit 12, and converts the XML received at the XML reception module 21 based thereupon.

The cache reference module 23 acquires the XML from the cache memory 14 according to an instruction from the XML conversion module 22. A function description written in the XML processing language and XPath are used for this instruction. The output distribution module 24 distributes a conversion result acquired by the XML conversion module 22 to the cache update module 26 or the XML transmission module 27. The output destination interpretation module 25 determines the output destination by referring to the conversion result acquired by the XML conversion module 22 and the output destination solution table 32, and designates the output destination to the output destination distribution module 24.

FIG. 2 is a conceptual chart showing an example of data of the output destination solution table 32 shown in FIG. 1. The output destination solution table 32 holds the corresponding relation between identifiers designated in the XML and actual output destinations in a form of table. An arbitrary character string can be used for the identifier, provided that it is unique in the output destination solution table 32. The output destination is either the cache memory 14 or the XML transmission module 27.

Returning to FIG. 1, the cache update module 26 adds and erases the XML to and from the cache memory 14. The cache memory 14 temporarily holds the output result in a form of XML. The XML transmission module 27 transmits the XML to an external output device such as the display 16 via the input/output part 13 by using a protocol such as HTTP.

The stored content of the cache memory 14 is in a single XML as a whole, and it is defined that a route element is <cache>. When an XML is added to the cache memory 14, a route element of the XML text to be added is added as a child element of the <cache> element. The name and the content of the child element can be determined freely according to the rule and the inputted XML since the conversion result acquired by the XML conversion module 22 is used as it is. Further, erasure from the cache memory 14 can be done by designation of the XPath. The element matched with the designated XPath is erased from the cache memory 14.

FIG. 3 is a flowchart showing the processing executed by the XML processing device 1 that is shown in FIG. 1. First, the XML reception module 21 receives an XML from outside by using a protocol such as HTTP, and gives it to the XML conversion module 22 (step S101). The XML conversion module 22 reads out the conversion rule 31 from the storage unit 12, and makes an inquiry at the cache reference module 23 about cache reference in the conversion rule 31. The cache reference description in the conversion rule is written in a form of XPath function call. The cache reference module 23 reads out the cache and returns the XML element to the XML conversion module 22 to solve the cache reference (step S102).

In a case where the cache includes data of <sensor><temperature>20</temperature></sensor>, for example, "20" that is the content of the first <temperature> element can be referred by a description of cache( )/sensor/temperature[1]/text( ).

Subsequently, the XML conversion module 22 converts the XML received from the XML reception module 21 based on the conversion rule 31 read out from the storage unit 12, and gives the converted XML to the output distribution module 24 (step S103). The conversion rule 31 is written in an XML processing language such as XSLT or XQuery.

The output distribution module 24 gives the XML supplied from the XML conversion module 22 to the output destination interpretation module 25 to inquire about the output destination. The output destination interpretation module 25 extracts the output destination from the XML in a following procedure. The converted XML is in a form such as <result><output to ="cache"><append>( . . . )</append></output><output to ="http">( . . . ) </output></result>, for example.

The output destination interpretation module 25 first searches <output> element from the XML (step S104). Then, the output destination interpretation module 25 checks the content of "to" attribute, and determines the output destination of the XML either to the cache update module 26 or the XML transmission module 27 according to the content (step S105). It is determined by referring to the output destination solution table 32. As shown in FIG. 2, the output destination solution table 32 holds the corresponding relation between the identifier designated in the XML and the actual output destination in a form of table.

As a result, when the output destination is the cache update module 26, the cache memory 14 is updated according to the content of the child element of the <output> element (step S106). When the child element is <append>, the content of a child element thereof is further added to the cache memory 14. When the child element is <remove>, the element designated by "select" attribute of the "remove" element is erased from the cache memory 14. When the output destination is the XML transmission module 27, the content of the child element of the <output> element is outputted to the outside by using a protocol such as HTTP (step S107).

Thereafter, the processing shown in steps S104-S107 is repeated for all the XML elements, and the operation is ended when there is no more XML element on which the processing is uncompleted (step S108).

FIG. 4 is a conceptual chart showing an example of the conversion rule 31 shown in FIG. 1. The conversion rule 31 is written in XSLT. It is assumed here that the XML reception module 21 receives the temperature measurement data of "20 degrees Celsius", for example, in a form of XML such as <sensor><temperature>20</temperature></sensor> from the temperature sensor 15. Hereinafter, it is to be understood that the unit of temperatures is Celsius in all the cases, and the temperature of "20 degrees Celsius", for example, is simply expressed as "20 degrees".

Further, it is assumed that the cache memory 14 stores the previous temperature measurement data and one before transmitted from the temperature sensor ("17 degrees" for one before the previous data, and "19 degrees" for the previous data) in a form of <cache><temperature>17</temperature><temperature>19</temperature></cache>.

The conversion rule 31 intends an operation of transmitting reception information of past three times when the received temperature information is 20 degrees or higher. More specifically, "xsl:if" text 201 on the fifth to eleventh rows intends an operation of "outputting the temperature saved in the cache memory 14 and the temperature currently detected by the sensor to <output> element "http" when the temperature detected by the sensor is 20 degrees or higher".

Further, "output" text 202 on the thirteenth to seventeenth rows intends an operation of "outputting the current temperature detected by the sensor to <output> element "cache"", and "output" text 203 on the eighteenth to twentieth rows intends an operation of "erasing stored data of past three times and before of <output> element "cache" (keeps only the data of past two times)".

When the XML reception module 21 receives the XML of <sensor><temperature>20</temperature></sensor> from the temperature sensor 15 in step S101, the XML conversion module 22 converts and outputs the XML by using the conversion rule 31 and the content of the cache memory 14 in step S103.

FIG. 5 is a conceptual chart showing an example of the XML that is outputted by the XML conversion module 22 in step S103 of FIG. 3 according to the conversion rule 31 shown in FIG. 4. Since the temperature information (content of temperature element) of the received XML is 20 or higher, the temperatures of past two times saved in the cache memory 14 and the current temperature detected by the sensor, i.e., the temperatures of past three times (17 degrees for one before the previous time, 19 degrees for the previous time, and 20 degrees for this time) are outputted for the <output> element "http" with "output" text 251 on the second to eighth rows according to the judgment of "xsl:if" instruction of the XSLT.

Further, the current temperature "20 degrees" is outputted to the <output> element "cache" with "output" text 252 on the ninth to thirteenth rows, and the stored data of three times before or more of the <output> element "cache" is erased with "output" text 253 on the fourteenth to sixteenth rows. That is, the temperature "19 degrees" of one before the previous time and the temperature "20 degrees" of previous time are stored in the cache memory 14.

In step S104, the output destination interpretation module 25 refers to the XML that is converted and outputted by the XML conversion module 22, and gives an instruction to output the content of the first <output> element, i.e., <sensor><temperature>17</temperature><temperature>19</temperature><temperature>20</temperature></sensor> to the XML transmission module 27. The XML transmission module 27 outputs this content to the outside.

The output destination interpretation module 25 gives an instruction to output <append><temperature>20</temperature></append> as the content of next <output> element to the cache update module 26. As a result, a new <temperature> element is added to the cache memory 14 by the cache update module 26.

Further, the output destination interpretation module 25 gives an instruction to output the content of the next <output> element, i.e., <remove select="/cache/temperature [position ( )<=last( )-2]"/> to the cache update module 26. The Xpath that is the content of the attribute of "select" matches with a <temperature> element that is a result of excluding two last child elements among the child elements of the <cache> element, so that the content of the cache memory 14 is erased except the last two <temperature> elements. In order to express the XPath in the XML, a less-than symbol ("<") is replaced with "<". The content of the cache memory 14 is used when the XML reception module 21 receives an XML next time.

Any arbitrary names can be used for the elements and attributes of the XML used in the exemplary embodiment heretofore, as long as each element and attribute can be discriminated uniquely therewith. The names shown in the charts, such as "output", "result", "append", and "remove" are used merely as a way of examples.

In this exemplary embodiment, the cache memory for storing the XML is provided, and the cache reference module makes it possible to refer to and update the cache memory based on the rule written in the XSLT. Thus, processing of format conversion for asynchronous XML can be written by the XSLT. Users can write the rule in an existing XSLT and design an XML processing mechanism having a state without doing any special learning. With the rule written in the XSLT, reference and erasure of the cache memory can be easily written by a single XPath.

The output from the XML transmission module 27 showing a specific state of the temperature may be received at another device which may execute processing such as showing an alert on the display device, sounding an alert by a buzzer, an electronic mail, or the like, recording such data to a database, and giving a feedback to a temperature control mechanism to execute temperature adjustment. Other than the temperatures, the exemplary embodiment can also be applied to devices which asynchronously output humidity, RFID, impacts, and the like in an XML.

Second Exemplary Embodiment

FIG. 6 is a block diagram showing the structure of an XML processing device 301 according to a second exemplary embodiment of the invention. The hardware structure of the XML processing device 301 is the same as that of the XML processing device 1 according to the first exemplary embodiment, so that explanations thereof are omitted. Note, however, that a temperature sensor 315a and a humidity sensor 315b as a plurality of input devices are connected to the input/output part 13.

In the second exemplary embodiment shown in FIG. 6, XML conversion modules 322a, 322b are connected in series, a cache memory 14 that is shared by each of the series-connected XML conversion modules 322a, 322b for temporarily saving conversion results acquired by each of the XML conversion modules 322a, 322b is provided, and output destination interpretation modules 325a, 325b as well as output destination distribution modules 324a, 324b are provided in multiple stages by corresponding to the serially-connected XML conversion modules 322a, 322b. Hereinafter, this will be described in a specific manner.

The control unit 11 includes XML reception modules 321a, 321b, the XML conversion modules 322a, 322b, and conversion rules 331a, 331b, which correspond to a temperature sensor 315a and a humidity sensor 315b, respectively. The XML converted by the XML conversion modules 322a and 322b is outputted to the output distribution module 324a. The output distribution module 324a has the output destination interpretation module 325a and an output destination solution table 332a. Further, at a latter stage of the output distribution module 324a, an XML conversion module 322c, a conversion rule 331c, the output destination module 324b, the output destination interpretation module 325b, and an output destination solution table 332b are connected.

Each of the function parts basically has the same functions of the function parts that are under the same names contained in the XML processing device 1 of the first exemplary embodiment. Therefore, only the different aspects will be described herein, and explanations of other than those aspects will be omitted. Further, it is to be understood that each of the output destination solution tables 332a and 332b are the same as the output destination solution table 32 shown in FIG. 2 unless there is no specific reference being made.

FIG. 7 is a flowchart showing processing executed by the XML processing device 301 shown in FIG. 6. Out of two data processing systems, i.e., the system of the XML reception module 321a—the XML conversion module 322a—the conversion rule 331a, and the system of the XML reception module 321b—the XML conversion module 322b—the conversion rule 331b, either system that has received the XML performs the operation that is the same as the operation shown in steps S101-106 and 108 of FIG. 3. The difference with respect to the operation of the first exemplary embodiment shown in FIG. 3 is that, when the output destination of the XML from the output distribution module 324a in step S105 is not the cache update module 26, the output destination of the XML becomes the XML conversion module 322c to start with.

The XML conversion module 322c upon receiving the output of the XML from the output distribution module 324a solves the cache reference by referring to the conversion rule 331a in the same manner as that of step S102 (step S401), and then performs XML conversion as in the same manner as that of step S103 (step S402). The converted XML is interpreted by the output distribution module 324b and the output destination interpretation module 325b to search the description of the output destination (step S403) and, the output destination is judged (step S404).

As a result, the cache memory 14 is updated when the output destination is the cache (step S405), and the XML is outputted to the outside from the XML transmission module 27 if not (step S406). The processing described heretofore is repeated for all the XML elements in regards to the result of the second conversion given to the XML conversion module 322c (step S407).

FIG. 8 and FIG. 9 are conceptual charts showing an example of the conversion rules 331a-c shown in FIG. 6. It is assumed here that the XML reception module 321a receives the temperature measurement data of "19 degrees", for example, in an XML form of <sensor><temperature>19</temperature></sensor> from the temperature sensor 315a. Further, it is assumed that the XML reception module 321b receives the humidity measurement data of "30%", for example, in an XML form of <sensor><humidity>30</humidity></sensor> from the humidity sensor 315b. Hereinafter, the unit of the humidity is "%" in all the cases.

There is considered herein a case where those two kinds of information regarding the temperature and the humidity are respectively received asynchronously, and the temperature and the humidity are collectively transmitted as a single XML at a point where the two kinds of information are received. Further, it is assumed that there is no information stored in the cache memory 14 in an initial state.

The conversion rule 331a for the XML conversion module 322a shown in FIG. 8A designates that the output destination of the XML is <output> element "henkan3" when the output destination of the XML is the XML conversion module 322c. First, "output" text 501 on the fifth to seventh rows intends an operation of outputting "dummy" to the <output> element "henkan3", "output" text 502 on the eighth to tenth rows intends an operation of erasing the data of the <output> element "cache", and "output" text 503 on the eleventh to fifteenth rows intends an operation of outputting the current temperature detected by the sensor to the <output> element "cache".

The conversion rule 331b for the XML conversion module 322b shown in FIG. 8B also designates to output to the <output> element "henkan3" when the output destination of the XML is the XML conversion module 322c. First, "output" text 511 on the fifth to seventh rows intends an operation of outputting "dummy" to the <output> element "henkan3", "output" text 512 on the eighth to tenth rows intends an operation of erasing the data of the <output> element "cache", and "output" text 513 on the eleventh to fifteenth rows intends an operation of outputting the current humidity detected by the sensor to the <output> element "cache".

The conversion rule 331c for the XML conversion module 332c shown in FIG. 9C operates upon receiving the output of "dummy" from the XML conversion modules 332a and b. First, "xsl:if" text 521 on the fifth to fifteenth rows intends an operation of "outputting the temperature and the humidity when there is the data of both the temperature and the humidity in the cache memory 14, and erasing the cache memory 14". More specifically, the temperature and humidity data is outputted to the <output> element "http" with "output" text 522 on the sixth to eleventh rows, and the cache memory 14 is erased with "output" text 523 on the twelfth to fourteenth rows.

FIG. 10 is a conceptual chart showing an example of the XML that is outputted by the XML conversion modules 322a-c in each step of FIG. 7 according to the conversion rules 331a-c shown in FIG. 8 and FIG. 9. First, it is assumed that the XML reception module 321a has received the temperature information of <sensor><temperature>19</temperature></sensor>. This is converted by the XML conversion module 322a, and the XML as shown in FIG. 10A is outputted to the XML conversion module 322c.

As a result, the content of <cache><temperature>19</temperature></cache> is stored in the cache memory 14. The XML conversion module 332c tries to perform conversion processing upon receiving the XML of <dummy/>. However, "humidity" is not contained in the cache memory 14. Thus, processing of "xsl:if" text 521 in the conversion rule 331c of FIG. 8C is not executed, and an empty "result" element is outputted to the output distribution module 324b. The output distribution module 324b does not perform anything.

Then, it is assumed that the XML reception module 321b has received the humidity information of <sensor><humidity>30</humidity></sensor>. This is converted by the XML conversion module 322b, and the XML as shown in FIG. 10B is outputted to the XML conversion module 322c.

As a result, the content of the cache memory 14 becomes <cache><temperature>19</temperature><humidity>30</humidity></cache>. The XML conversion module 322c performs conversion processing upon receiving the XML of <dummy/>. Since both "temperature" and "humidity" are contained in the cache memory 14, the XML conversion module 322c executes the processing of "xsl:if" text 521 in the conversion rule 331c to output the XML shown in FIG. 10C, and the output distribution module 324b upon receiving it outputs the XML to both the XML transmission module 27 and the cache update module 26, respectively.

To the XML transmission module 27, <sensor><temperature>19</temperature><humidity>30</humidity></sensor> is outputted, and the XML in which the temperature information and the humidity information are combined is to be transmitted. Further, to the cache update module 26, <remove select="/cache/*"/> is outputted, and the cache memory 14 is cleared.

In this exemplary embodiment, the information inputted asynchronously is all outputted to the cache by forming the XML conversion modules in multiple stages, so that the information can further be XML-converted. This makes it possible to easily write the conversion piles for the asynchronously inputted information. While the case of two kinds of input information such as the temperature and the humidity has been described, the same method can be easily expanded and employed to cases where there are still more numbers of inputs in addition to the temperature and the humidity.

Third Exemplary Embodiment

FIG. 11 is a block diagram showing the structure of an XML processing device 601 according to a third exemplary embodiment of the invention. The hardware structure of the XML processing device 601 is the same except that there are two cache memories 614a and 614b.

Further, compared to each function part of the XML conversion processing device 1 according to the first exemplary embodiment shown in FIG. 1, the control unit 11 executes a named cache reference module 628 instead of the cache reference module 23 and executes a named cache update module 629 instead of the cache update module 26, respectively. The storage unit 12 stores a cache name table 633 in addition to each data in the XML processing device 1. Further, instead of the conversion rule 31, a conversion rule 631 to be described later is stored. Elements other than those aspects are the same as those of the XML processing device 1 according to the first exemplary embodiment, so that explanations thereof are omitted by applying same reference numerals and names to the same elements.

FIG. 12 is a conceptual chart showing a data example of the cache name table 633 shown in FIG. 11. Each of the cache memories 614a and 614b is a cache memory that can hold a single XML document. The cache memories 614a and 614b can be designated as <output> elements "temp1" and "temp2", respectively. Further, the named cache reference module 628 refers to the cache name table 633. The named cache reference module 628 refers to the cache memory 614a when an identifier "temp 1" is designated, and refers to the cache memory 614b when an identifier "temp2" is designated. Similarly, the named cache update module 629 updates the stored contents of the cache memories 614a and 614b, respectively.

FIG. 13 is a flowchart showing the processing executed by the XML processing device 601 shown in FIG. 11. The processing to be executed is roughly the same operation shown in steps S101-108 of FIG. 3. However, in this exemplary embodiment, the cache name is written in the conversion rule written in the XML processing language, and the named cache reference module 628 refers to the cache name table 633 after the XML reception module 21 receives the XML in step S101 to determine whether to refer to the cache memory 614a or to the cache memory 614b (step S701), and performs processing of step S102 by referring to the determined cache memory.

Further, in a case where the output destination of the XML is the cache memory in step S105, the named cache update module 629 also refers to the cache name table 633 to determine whether to refer to the cache memory 614a or to the cache memory 614b (step S702), and performs processing of step S106 by referring to the determined cache memory. The others are the same as the processing of FIG. 3, so that explanations thereof are omitted.

FIG. 14 is a conceptual chart showing an example of the conversion rule 631 shown in FIG. 11. It is assumed that the XML reception module 21 receives the temperature measurement data of "20 degrees", for example, in an XML form of <sensor><temperature>20</temperature></sensor> from the temperature sensor 15. The conversion rule 631 intends to receive the temperature information as an input, and to output the temperature information of three-time measurements when there are three consecutive inputs of 20 degrees or higher or three consecutive inputs of 5 degrees or lower. History information of the case where the temperature information of 20 degrees or higher continues is saved in the cache memory 614a, and history information of the case where the temperature information of 5 degrees or lower continues is saved in the cache memory 614b.

In the conversion rule 631, first, the cases are discriminated according to the received temperature information with "xsl: choose" text 801 on the fifth to forty-fifth rows. In the case of 20 degrees or higher, the processing on the sixth to twentieth rows is executed. In the case of 5 degrees or lower, the processing on the twenty-first to thirty-fifth rows is executed. In the case where it is neither 20 degrees or higher nor 5 degrees or lower, the processing on the thirty-sixth to forty-fourth rows is executed.

For the processing on the sixth to twentieth rows executed in the case of 20 degrees or higher, first, "xsl:if" text 802 on the seventh to fourteenth rows intends to "output the temperature saved in the cache memory 614a and the current temperature detected by the sensor to the <output> element "http", when there are two or more pieces of data stored in the cache memory 614a". Thereafter, <output> text 803 on the fifteenth to nineteenth rows intends an operation of "outputting the current temperature detected by the sensor to the <output> element "temp1" (the cache memory 614a) regardless of the number of pieces of data stored in the cache memory 614a".

For the processing on the twenty-first to thirty-fifth rows executed in the case of 5 degrees or lower, first, "xsl:if" text 811 on the twenty-second to twenty-ninth rows intends to "output the temperature saved in the cache memory 614b and the current temperature detected by the sensor to the <output> element "http", when there are two or more pieces of data stored in the cache memory 614a". Thereafter, <output> text 812 on the thirtieth to thirty-fourth rows intends an operation of "outputting the current temperature detected by the sensor to the <output> element "temp2" (the cache memory 614b) regardless of the number of pieces of data stored in the cache memory 614b".

Regarding the processing on the thirty-sixth to forty-fourth rows for the case where it is neither 20 degrees or higher nor 5 degrees or lower, the cache memory 614a is erased with "output" text 821 on the thirty-seventh to thirty-ninth rows, and the cache memory 614b is erased with "output" text 822 on the fortieth to forty-second rows.

It is assumed here that the XML held by the cache memory 614a is empty (<cache/>), and the XML held by the cache memory 614b is <cache><temperature>3</temperature><temperature>4<temperature></cache>. This is a cache state after receiving the temperature information of 5 degrees or lower for two consecutive times. Here, the XML reception module 21 receives the XML of <sensor><temperature>–3</temperature></sensor> from the temperature sensor 15.

FIG. 15 is a conceptual chart showing an example of the XML that is outputted by the XML conversion module 22 in step S103 of FIG. 13 according to the conversion rule 631, shown in FIG. 14. The cache memory 614b has exactly two <temperature> elements, so that the XML conversion module 22 outputs the temperature saved in the cache memory 614b and the current temperature detected by the sensor to the <output> element "http" according to "xsl:if" text 811. Then, the XML conversion module 22 outputs the current temperature detected by the sensor to the <output> element "temp2" with "output" text 812.

The argument "temp2" given to the "cache" function is interpreted by the named cache reference module 628, and the cache name table 633 is referred to acquire the cache memory 614b as the access target. Further, the attribute value "temp2" of the "output" text 812 is interpreted by the named cache update module 629, and the cache name table 633 is referred to acquire the cache memory 614b as the access target. As a result, the "temperature" element is added to the cache memory 614b.

In a case where the XML reception module 21 receives the temperature information of 20 degrees or higher from the temperature sensor 15, the same operation as the operation described above is also performed on the cache memory 614a (<output> element "temp 1", the argument "temp1"). Further, when the temperature information of neither 20 degrees or higher nor 5 degrees or lower is received, the cache memories 614a and 614b are both erased.

With the exemplary embodiment, the state can be stored in a plurality of cache memories. This makes it possible to generate a plurality of pieces of information indicating different objects such as 5 degrees or lower and 20 degrees or higher. In this exemplary embodiment, an example of the case with two cache memories has been described. However, the same method can be easily expanded and applied to cases where there are three or more cache memories.

While the present invention has been described by referring to the specific embodiments shown in the drawings, the present invention is not limited only to those embodiments shown in the drawings. It is needless to mention that any known structures can be employed as long as the effects of the present invention can be achieved therewith.

This Application is the National Phase of PCT/JP2009/057330, filed Apr. 10, 2009, which claims the Priority right based on Japanese Patent Application No. 2008-126515 filed on May 13, 2008 and the disclosure thereof is hereby incorporated by reference in its entirety.

INDUSTRIAL APPLICABILITY

The present invention can be utilized in devices where it is necessary to convert the XML formats asynchronously.

BRIEF DESCRIPTION OF THE DRAWINGS

FIG. 2 is a conceptual chart showing an example of data of an output destination solution table shown in FIG. 1;

FIG. 4 is a conceptual chart showing an example of a conversion rule shown in FIG. 1;

FIG. 5 is a conceptual chart showing an example of an XML that is outputted from an XML conversion module in step S103 of FIG. 3 based on the conversion rule shown in FIG. 4;

FIG. 8 is a conceptual chart showing an example of the conversion rule shown in FIG. 6;

FIG. 9 is a conceptual chart following that of FIG. 8;

FIG. 10 is a conceptual chart showing an example of an XML that is outputted from an XML conversion module in each step of FIG. 7 based on the conversion rule shown in FIG. 8 and FIG. 9;

FIG. 11 is a block diagram showing the structure of an XML processing device according to a third exemplary embodiment of the invention;

FIG. 12 is a conceptual chart showing an example of data of a cache name table shown in FIG. 11;

FIG. 14 is a conceptual chart showing an example of a conversion rule shown in FIG. 11; and FIG. 15 is a conceptual chart showing an example of an XML that is outputted from an XML conversion module in step S103 of FIG. 13 based on the conversion rule shown in FIG. 14.

Figure 1:
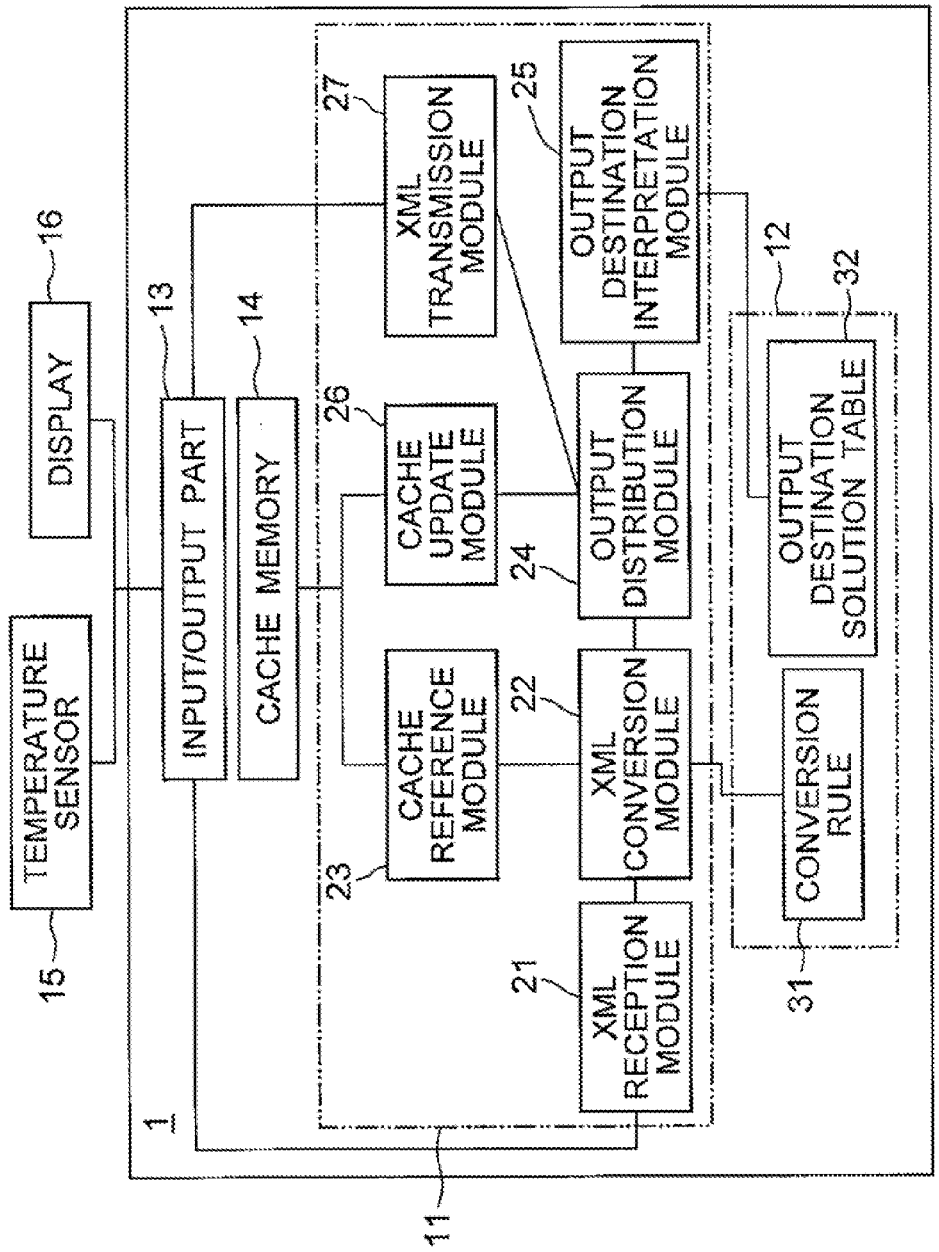
FIG. 1 is a block diagram showing the structure of an XML processing device according to a first exemplary embodiment of the invention.
Figure 3:
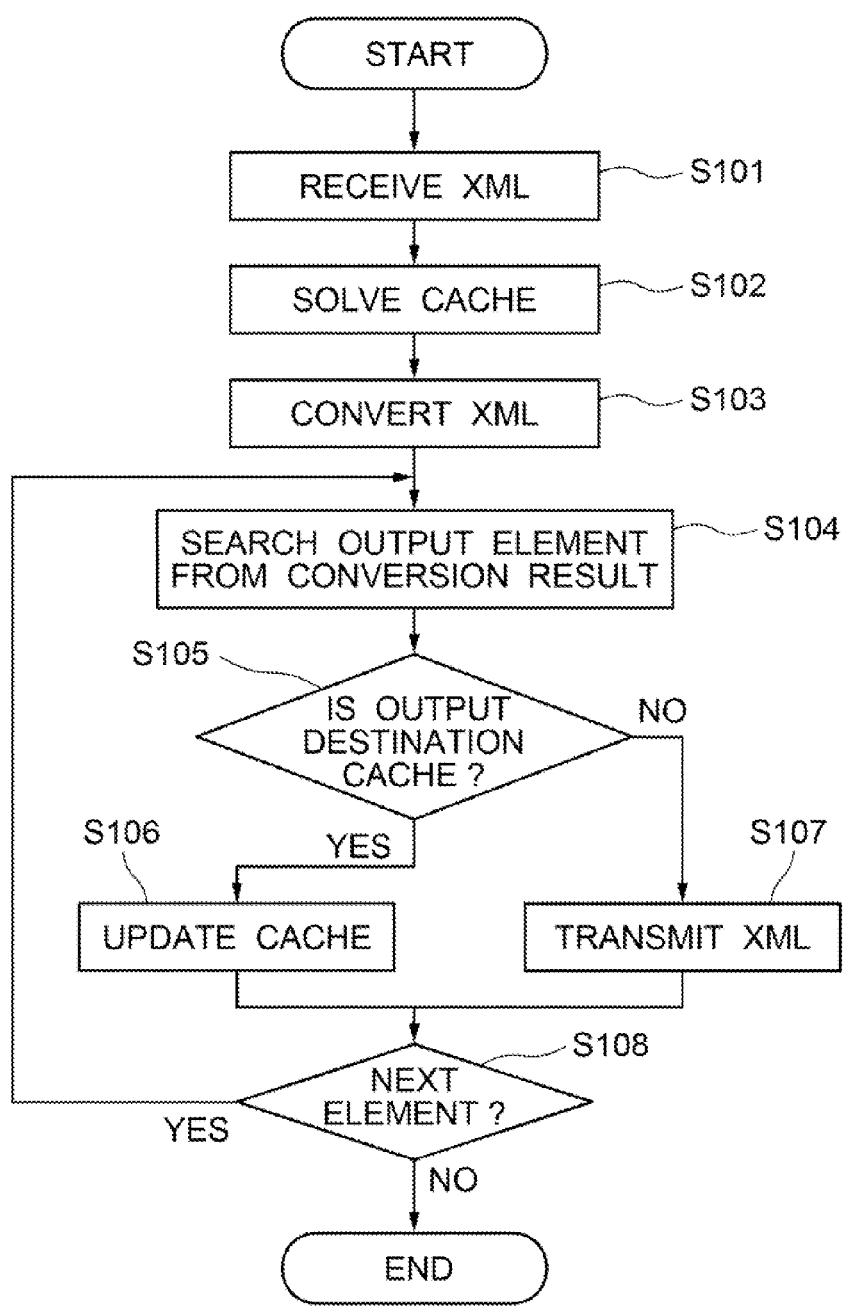
FIG. 3 is a flowchart showing processing that is executed by the XML processing device shown in FIG. 1.
Figure 6:
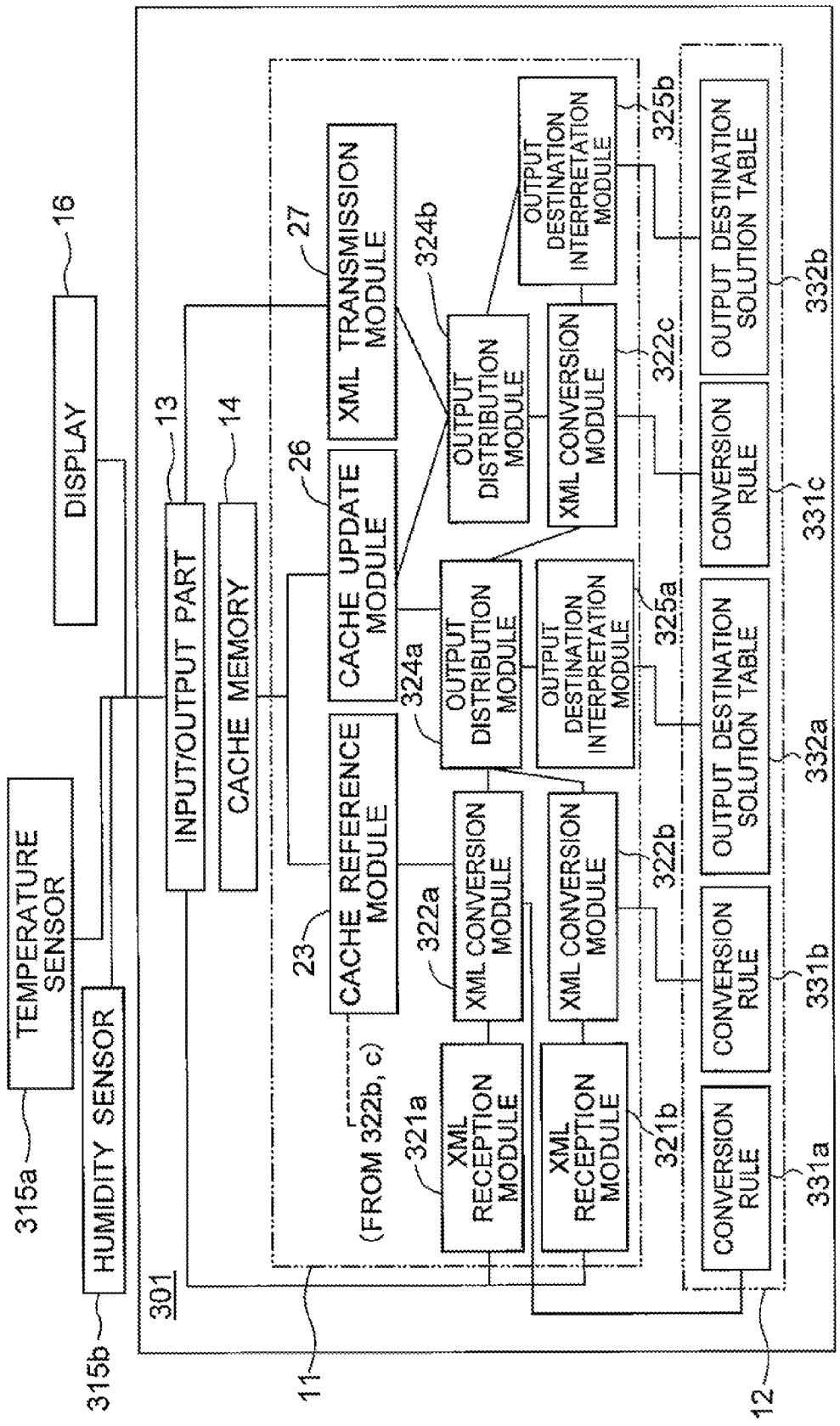
FIG. 6 is a block diagram showing the structure of an XML processing device according to a second exemplary embodiment of the invention.
Figure 7:
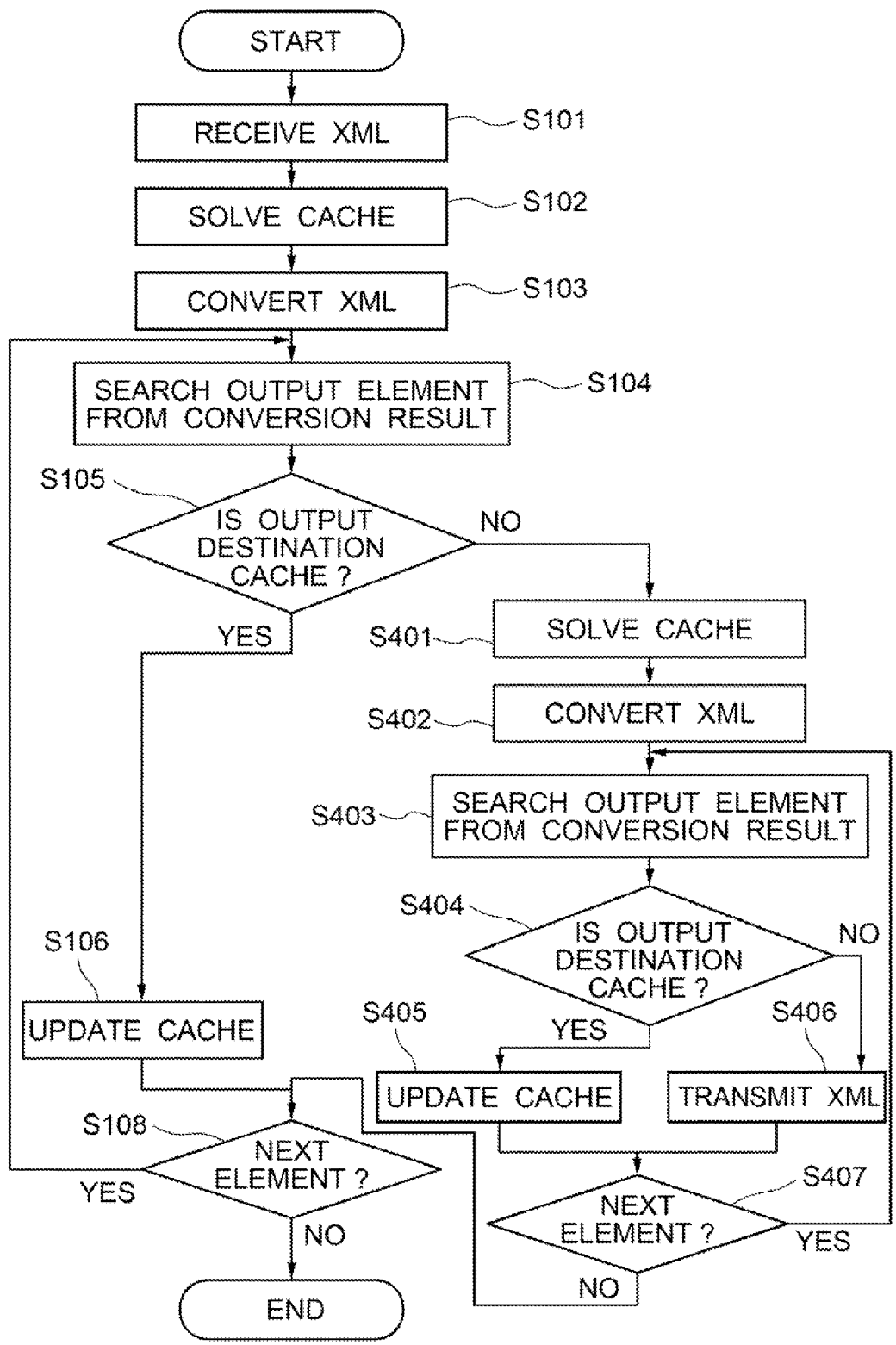
FIG. 7 is a flowchart showing processing that is executed by the XML processing device shown in FIG. 6.
Figure 13:
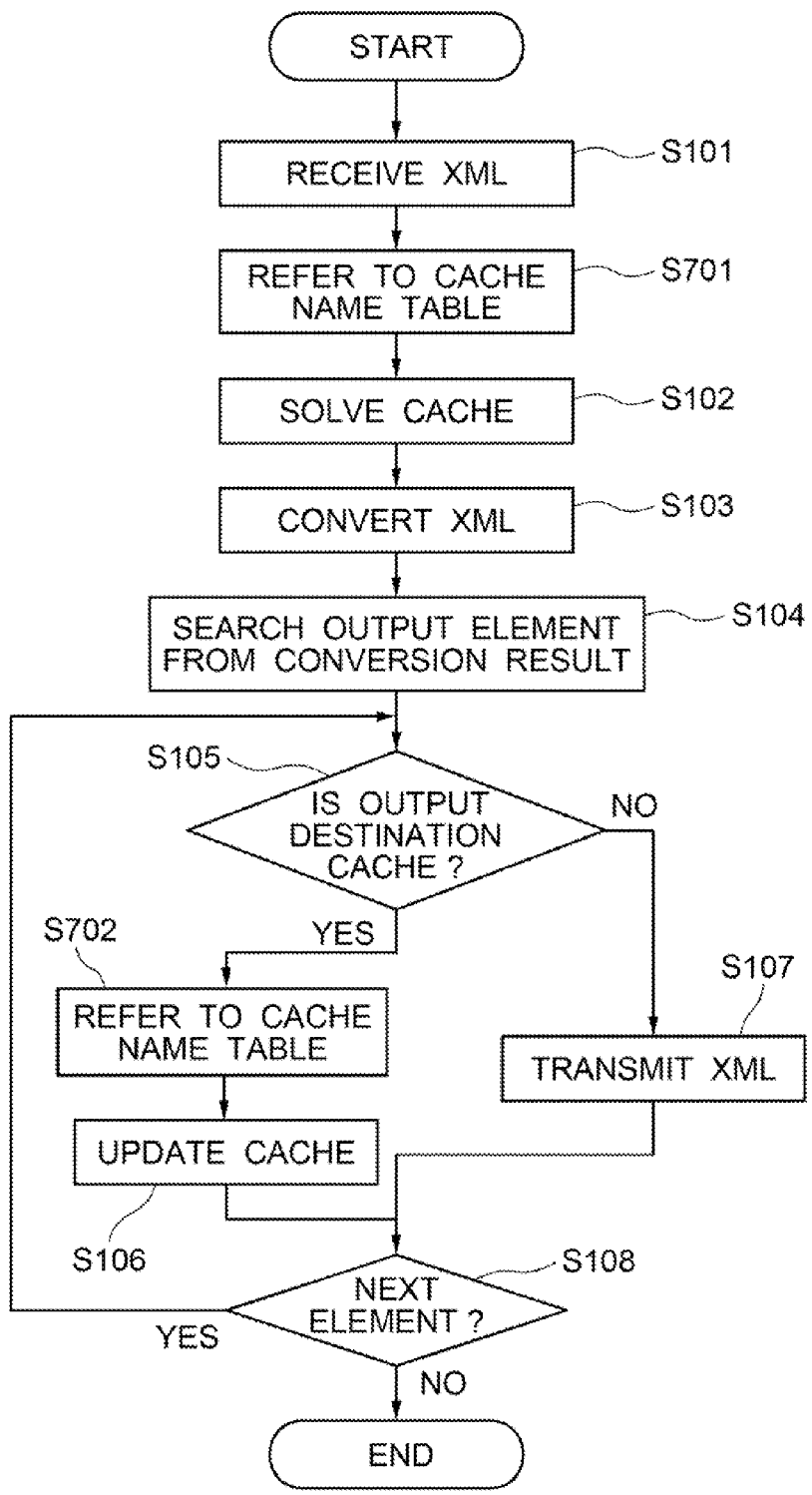
FIG. 13 is a flowchart showing processing that is executed by the XML processing device shown in FIG. 11.

REFERENCE NUMERALS 1, 301, 601 XML processing device
11 Control unit
12 Storage unit
13 Input/output part
14, 614a, 614b Cache memory
15, 315a Temperature sensor
16 Display
21, 321a, 321b XML reception module
22, 322a, 322b, 322c XML conversion module
23 Cache reference module
24, 324a, 324b Output distribution module
25, 325a, 325b Output destination interpretation module
26 Cache update module
27 XML transmission module
31, 331a, 331b, 331c, 631 Conversion rule
32, 332a, 332b Output destination solution table
315b Humidity sensor
628 Named cache reference module
629 Named cache update module
633 Cache name table

The invention claimed is:

1. An Extensible Markup Language (XML) processing device which converts and outputs an XML inputted asynchronously from outside according to a conversion rule, comprising:
a storage unit that stores the conversion rule written in an XML processing language and an output destination solution table that defines an output destination of the XML, the output destination of the XML corresponding to identifiers contained in the conversion rule;
a cache memory that temporarily stores the XML;
a cache reference module that acquires the XML from the cache memory;
a cache update module that adds the XML to the cache memory and erases the XML from the cache memory;
an XML conversion module that refers to the XML of the cache memory by the cache reference module and converts the XML according to the conversion rule read out from the storage unit, when the XML is inputted;
an output destination interpretation module that interprets the output destination corresponding to the identifiers contained in the conversion rule and written in an attribute or an element of the XML converted by the XML conversion module based on a content defined by the output destination solution table; and
an output distribution module that outputs the converted XML to the cache update module when the output destination of the converted XML is the cache update module defined in the output destination solution table, and outputs the converted XML to an XML transmission module that transmits the converted XML to an external output device by using Hypertext Transfer Protocol (HTTP) protocol when the output destination of the converted XML is the XML transmission module.

2. The XML processing device as claimed in claim 1, comprising:
a plurality of the cache memories; and
a named cache reference module that relates the output destinations written in the XML and the plurality of cache memories.

3. The XML processing device as claimed in claim 1, comprising:
a plurality of the cache memories; and
a named cache update module that relates the output destination written in the outputs from the output distribution module with the plurality of cache memories, and adds and erases the XML to/from the plurality of cache memories.

4. The XML processing device as claimed in claim 1, wherein:
the XML conversion modules are connected in series;
a cache memory shared by the serially-connected XML conversion modules for temporarily saving conversion results of each of the XML conversion module is provided; and
the output destination interpretation modules and the output distribution modules are provided in multiple stages by corresponding to the serially-connected XML conversion modules.

5. A non-transitory computer readable recording medium storing an XML processing method which converts and outputs an XML inputted from outside according to a prescribed rule, comprising:
storing the rule written in an XML processing language and an output destination solution table that defines an output destination of the XML in a storage unit, the output destination of the XML corresponding to identifiers contained in the conversion rule, and temporarily storing the XML in a cache memory;
referring to the XML of the cache memory and converting the XML according to the conversion rule read out from the storage unit, when the XML is inputted;
interpreting the output destination corresponding to the identifiers contained in the conversion rule and written in an attribute or an element of the converted XML based on a content defined by the output destination solution table;
outputting, adding, and erasing the converted XML to/from the cache memory, when the output destination of the converted XML is the cache memory defined in the output destination solution table; and
outputting the converted XML to an XML transmission module that transmits the converted XML to an external output device by using HTTP protocol when the output destination of the converted XML is the XML transmission module.

6. A non-transitory computer readable recording medium storing an XML processing program for causing a computer, which controls an XML processing device that converts and outputs an XML inputted from outside according to a prescribed rule, to execute:
a function that stores the conversion rule written in an XML processing language and an output destination solution table that defines an output destination of the XML in a storage unit, the output destination of the XML corresponding to identifiers contained in the conversion rule, and stores temporarily the XML in a cache memory;
a function that refers to the XML of the cache memory and converts the XML according to the conversion rule read out from the storage unit, when the XML is inputted;
a function that interprets the output destination corresponding to tile identifiers contained in the conversion role and written in an attribute or an element of the converted XML based on a content defined by the output destination solution table;
a function that outputs, adds, and erases the converted XML to/from the cache memory, when the output destination of the converted XML is the cache memory defined in the output destination solution table; and
a function that outputs the converted XML to an XML transmission module that transmits the converted XML to an external output device by using HTTP protocol when the output destination of the converted XML is the XML transmission module.

7. An XML processing device which converts and outputs an XML inputted asynchronously from outside according to a conversion rule, comprising:

storage means for storing the conversion rule written in an XML processing language and an output destination solution table that defines an output destination of the XML;

the output destination of the XML corresponding to identifiers contained in the conversion rule;

a cache memory that temporarily stores the XML;

cache reference means for acquiring the XML from the cache memory;

cache update means for adding the XML to the cache memory and erasing the XML from the cache memory;

XML conversion means for referring to the XML of the cache memory by the cache reference means and converting the XML according to the conversion rule read out from the storage means, when the XML is inputted;

output destination interpretation means for interpreting the output destination corresponding to the identifiers contained in the conversion rule and written in an attribute or an element of the XML converted by the XML conversion means based on a content defined by the output destination solution table; and output distribution means for outputting the converted XML to the cache update means when the output destination of the converted XML is the cache update means defined in the output destination solution table, and outputting the converted XML to an XML transmission means that transmits the converted XML to an external output device by using HTTP protocol when the output destination of the converted XML is the XML transmission means.

* * * * *